Patented Mar. 13, 1945

2,371,500

UNITED STATES PATENT OFFICE 2,371,500

POLYFUNCTIONAL ETHERS AND METHOD OF MAKING SAME

Edgar C. Britton and Harold R. Slagh, Midland, Mich., assignors to The Dow Chemical Company, Midland, Mich., a corporation of Michigan No Drawing. Application July 2, 1942, Serial No. 449,511

1 Claim. (Cl. 260—348)

This invention concerns certain new complex ethers containing a plurality of different reactive or functional groups, and a method of making the same.

The new ethers with which the invention is concerned have the general formula:

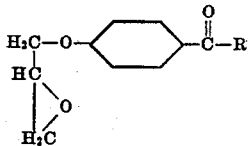

wherein R is a monovalent aliphatic radical or an aromatic radical which is attached through a nuclear carbon atom to the carbonyl group. The ethers are in most instances crystalline solids at room temperature, although they may in some instances be liquids or non-crystallizable resinous solids. Because of the presence therein of the three different functional groups, i. e. an olefine oxide group, an ether group and the carbonyl or ketonic group, they are suitable for use as chemical agents in any of a wide variety of chemical reactions for the preparation of valuable derivatives thereof. Types of reactions involving one or more of the kinds of functional groups present in the new products are well known and do not require illustration. The new products are also useful as plasticizing agents and/or stabilizers for organic plastics; particularly for the polymers and copolymers of vinylidene chloride. The new products, when incorporated with polymerized vinylidene chloride or with a copolymer of vinylidene chloride and another vinyl compound such as vinyl chloride or styrene, etc., have the effects of increasing the flow of the polymer during molding and of stabilizing the polymer against decomposition or discoloration by heat.

The ether products are prepared by reacting epichlorohydrin with an alkali metal salt of a keto-phenol. Examples of such salts of keto-phenols which may be employed are the sodium or potassium salts of 2-hydroxy-acetophenone, 3-hydroxy-acetophenone, 4-hydroxy-acetophenone, 2-hydroxy-benzophenone, 4-hydroxy-benzophenone, 3,3'-dihydroxy-benzophenone, 4,4'-dihydroxy-benzophenone, 4-hydroxy-propiophenone, etc.

The reaction is carried out by heating a mixture of the epichlorohydrin and the keto-phenol salt, preferably with stirring, to a temperature sufficient to cause the reaction. The reactants may be employed in any desired proportions, but in practice it is usually most convenient to employ an excess of epichlorohydrin over that theoretically required for the reaction. The reaction may, if desired, be carried out in the presence of water or an inert organic liquid such as benzene, toluene, or ligroin, etc., as a reaction medium, but the presence of such medium is not required. The reaction is usually carried out at atmospheric pressure by heating epichlorohydrin to boiling under reflux and gradually adding the keto-phenol salt or a solution thereof with stirring, but it may be carried out in a closed reactor, e. g. an autoclave, at higher temperatures and pressures. In most instances the reaction occurs smoothly and quite rapidly at temperatures between 50° and 100° C., although, as just mentioned, higher temperatures, e. g. 125° C. or higher, may be employed.

After completing the reaction, the product is separated by usual procedure, e. g. fractional distillation or crystallization.

The following examples described certain ways in which the principle of the invention has been applied, but are not to be construed as limiting its scope.

Example 1

The sodium salt of 4-hydroxy-acetophenone was prepared by dissolving 68 grams (0.5 mole) of 4-hydroxy-acetophenone in a solution of 21 grams of sodium hydroxide and 250 cubic centimeters of water. The resultant solution was added in one hour to 69.5 grams (0.75 mole) of epichlorohydrin while stirring and heating the latter under reflux at temperatures between 85° and 90° C. Heating and stirring of the mixture at 90° C. were continued for another hour. The mixture was then permitted to settle into aqueous and organic layers and the layers were separated. The organic layer was fractionally distilled under vacuum. As the fraction distilling at temperatures between 184° and 195° C. at 2.5 millimeters absolute pressure there was obtained 49 grams of 4-(2,3-epoxy-propoxy) acetophenone. The product crystallized on standing. It was further purified by recrystallization from ethyl alcohol. The purified product is a white crystalline compound of melting point 39° C. Its formula is:

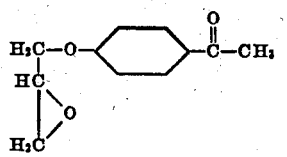

Example 2

A solution of 99 grams (0.5 mole) of 4-hydroxybenzophenone and 21 grams of sodium hydroxide in 200 cubic centimeters of water was added with stirring to 69.5 grams (0.75 mole) of epichlorohydrin while heating the latter at 70°–85° C. After completing the addition the mixture was heated under reflux and with continued stirring at temperatures between 85° and 90° C. for 1.5 hours. The mixture was then cooled, permitted to settle into layers, and the aqueous and organic layers were separated. The aqueous layer was found to contain 0.475 gram mole of sodium chloride, indicating that an equivalent amount of epichlorohydrin had reacted. The organic layer of the mixture amounted to 149 grams. It was fractionally distilled under vacuum. As the fraction distilling at temperatures between 222° and 244° C. at 2.5 millimeters absolute pressure there was obtained 74 grams of 4-(2.3-epoxy-propoxy) benzophenone, which product solidified on standing. 45 grams of higher boiling material remained as a residue from the distillation. The product was further purified by recrystallization from ethyl alcohol and was found to have a melting point of 81° C. The product is a white crystalline compound having the formula:

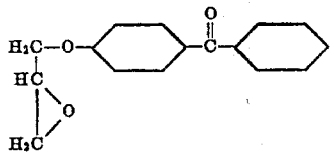

Example 3

A solution of 68 grams (0.5 mole) of 3-hydroxyacetophenone and 21 grams of sodium hydroxide in 250 cubic centimeters of water was added over a period of one hour to 69.5 grams (0.75 mole) of epichlorohydrin while stirring and heating the mixture at 90° C. The mixture was stirred and maintained at approximately 90° C. for another hour, after which it was permitted to cool and settle into layers and the layers were separated. The organic layer was fractionally distilled under vacuum. As the fraction distilling at temperatures between 176° and 185° C. at 2.5 millimeters absolute pressure, there was obtained 56 grams of 3-(2.3-epoxy-propoxy) acetophenone. The product solidified or standing. It was further purified by recrystallization from ethyl alcohol and was found to have a melting point of 43° C. It is a white crystalline compound having the formula:

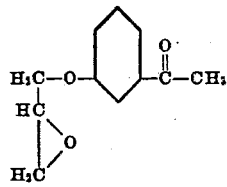

Example 4

A solution of 75 grams (0.56 mole) of 4-hydroxypropiophenone and 21 grams of sodium hydroxide in 250 cubic centimeters of water was added with stirring in one hour to 69.5 grams (0.75 mole) of epichlorohydrin while heating the mixture at 90° C. Stirring and heating of the mixture at said temperature was continued for another hour, after which the mixture was cooled and the layers thereof were separated. The organic layer was fractionally distilled under vacuum. There was obtained 57 grams of 4-(2.3-epoxy-propoxy) propiophenone as a fraction which distilled at temperatures between 194° and 202° C. at 2.5 millimeters pressure. The product, which solidified on standing, was further purified by recrystallization from ethyl alcohol. It is a white crystalline compound of pleasant odor. It possesses a melting point of 71.5° C. and has the formula:

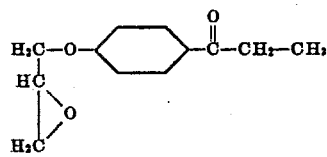

Example 5

A solution of 107 grams (0.5 mole) of 4.4'-dihydroxybenzophenone and 42.5 grams of sodium hydroxide in 250 cubic centimeters of water was added in one hour to 69.5 grams (0.75 mole) of epichlorohydrin while stirring and heating the mixture at 90° C. After completing the addition, stirring and heating of the mixture at approximately 90° C. were continued for another hour. The 4.4'-di-(2.3 - epoxy - propoxy) benzophenone product separated from the mixture as a cream-colored crystalline solid. The mixture was cooled, filtered and the residual cream-colored product was dried. It weighed 225 grams. It was found to be insoluble or only slightly soluble in each of the solvents methyl ethyl ketone, methyl alcohol, ethyl alcohol, amyl alcohol, petroleum ether, dioxane, acetic acid, ethylene chloride, benzene and toluene. It was fairly soluble in heated ethylene glycol and was purified by recrystallization from said solvent. The product is a white crystalline compound which melts at approximately 182° C. It has the formula:

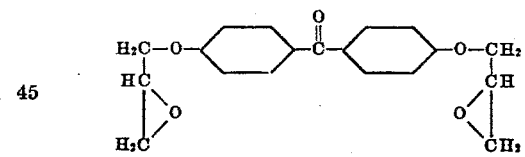

In place of epichlorohydrin, epibromohydrin may be employed as a reactant in forming the products.

Other modes of applying the principle of the invention may be applied instead of those explained, change being made as regards the method or compounds herein disclosed, provided the steps or compounds stated by the following claim or the equivalent of such stated steps or compounds be employed.

We therefore particularly point out and distinctly claim as our invention:

4.4'-di-(2.3 - epoxy - propoxy)benzophenone, a crystalline compound melting at approximately 182° C. and having the formula:

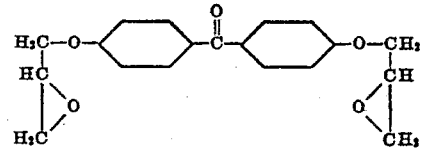

EDGAR C. BRITTON.
HAROLD R. SLAGH.